United States Patent
Burke et al.

(10) Patent No.: US 12,505,445 B2
(45) Date of Patent: Dec. 23, 2025

(54) FRAUD DETECTION SYSTEMS AND METHODS

(71) Applicant: Early Warning Services, LLC, Scottsdale, AZ (US)

(72) Inventors: Chris Burke, Scottsdale, AZ (US); Nagaraj Kollar, Scottsdale, AZ (US); Jacob Bellman, Scottsdale, AZ (US); Ronald Scott Alcorn, Austin, TX (US); Jie He, Naperville, IL (US); Laura E. Weinflash, Scottsdale, AZ (US); Jack Kohoutek, Chicago, IL (US); Clayton Meyer, Lakeland, FL (US)

(73) Assignee: Early Warning Services, LLC, Scottsdale, AZ (US)

( * ) Notice: Subject to any disclaimer, the term of this patent is extended or adjusted under 35 U.S.C. 154(b) by 240 days.

(21) Appl. No.: 17/824,688

(22) Filed: May 25, 2022

(65) Prior Publication Data

US 2022/0383323 A1   Dec. 1, 2022

Related U.S. Application Data

(60) Provisional application No. 63/192,979, filed on May 25, 2021.

(51) Int. Cl.
*G06Q 40/00* (2023.01)
*G06N 20/00* (2019.01)
(Continued)

(52) U.S. Cl.
CPC ......... *G06Q 20/4016* (2013.01); *G06N 20/00* (2019.01); *G06Q 20/20* (2013.01); *G06Q 20/407* (2013.01); *G08B 6/00* (2013.01)

(58) Field of Classification Search
CPC ... G06Q 20/4016; G06N 20/20; G06N 20/407
See application file for complete search history.

(56) References Cited

U.S. PATENT DOCUMENTS

| 11,748,757 B1 * | 9/2023 | Segal | G06Q 20/34 705/44 |
| 2008/0140576 A1 * | 6/2008 | Lewis | G06Q 30/02 707/999.107 |

(Continued)

FOREIGN PATENT DOCUMENTS

| WO | WO-2014000741 A1 * | 1/2014 | ....... G06Q 10/06398 |
| WO | WO-2021029878 A1 * | 2/2021 | ........... G07F 19/209 |

OTHER PUBLICATIONS

Shen et al., "Deep Q-Network-ased Adaptive Alert Threshold Selection Policy for Payment Fraud Systems in Retail Banking," arXiv:2010.11062v1 (cs.LG) 2020 (Year: 2020).*

(Continued)

*Primary Examiner* — Abhishek Vyas
*Assistant Examiner* — William B. Bunker
(74) *Attorney, Agent, or Firm* — Kilpatrick Townsend & Stockton LLP

(57) ABSTRACT

A payment and authentication network may include a communications interface, one or more processors, and a memory. The memory may have instructions stored thereon that, when executed by the one or more processors cause the one or more processors to receive, using the communications interface, transaction information associated with a transaction from a merchant system and generate a fraud risk score based on the transaction information. The instructions may cause the one or more processors to determine that the fraud risk score is indicative that the transaction is likely fraudulent and transmit an alert to a user device that informs a user of the user device that the transaction is likely fraudulent prior to generating an approval decision for the transaction.

18 Claims, 4 Drawing Sheets

(51) Int. Cl.
    *G06Q 20/20*     (2012.01)
    *G06Q 20/40*     (2012.01)
    *G08B 6/00*     (2006.01)

(56) References Cited

U.S. PATENT DOCUMENTS

| | | | |
|---|---|---|---|
| 2011/0238564 A1* | 9/2011 | Lim | G06Q 40/02 |
| | | | 705/38 |
| 2013/0232074 A1* | 9/2013 | Carlson | G06Q 20/42 |
| | | | 705/44 |
| 2018/0041899 A1* | 2/2018 | Richards | H04L 63/1425 |
| 2020/0082407 A1* | 3/2020 | Clower | G06Q 20/108 |
| 2021/0158356 A1* | 5/2021 | Goshen | G06Q 20/4015 |
| 2021/0233088 A1* | 7/2021 | Mehrotra | G06Q 20/22 |
| 2021/0326884 A1* | 10/2021 | Douglas | G06Q 20/4016 |
| 2022/0027750 A1* | 1/2022 | Poli | G06N 20/00 |
| 2022/0108331 A1* | 4/2022 | Thomson | G06Q 40/02 |
| 2022/0245641 A1* | 8/2022 | Wintle | G06Q 20/102 |
| 2022/0358508 A1* | 11/2022 | Pandillapalli | G06Q 20/36 |
| 2023/0298031 A1* | 9/2023 | Drapeau | G06Q 30/0185 |
| | | | 705/72 |
| 2023/0360051 A1* | 11/2023 | Kramme | G06Q 20/3224 |

OTHER PUBLICATIONS

Choudhury et al., "An Efficient Way to Detect Credit Card Fraud Using Machine Learning Methodologies," 978-1-5386-5657-01 IEEE 2018 (Year: 2018).*

* cited by examiner

FRAUD DETECTION SYSTEMS AND METHODS

CROSS-REFERENCES TO RELATED APPLICATIONS

This application claims the benefit of priority to U.S. Provisional Patent Application No. 63/192,979 filed May 25, 2021, entitled "FRAUD DETECTION SYSTEMS AND METHODS", the contents of which are herein incorporated in their entirety.

BACKGROUND OF THE INVENTION

Conventional payment systems facilitate transactions using one or more payment sources. While many financial systems have fraud detection services that help identify attempts to use stolen cards and other misuse of payment media, such payment systems do not sufficiently protect users from authorizing payments to scammers and/or other fraudsters. Therefore, users are often exposed to risks of various fraudulent transactions even while in sole possession of their payment media. This may result in financial losses for the user and/or the user's financial institution. Therefore, improvements in fraud detection in payment systems are desired.

BRIEF SUMMARY OF THE INVENTION

Embodiments of the present invention are directed to payment systems that provide real-time fraud risk scoring during a transaction. Embodiments may provide risk scores prior to payment to enable the user or the user's financial institution to cancel the transaction prior to the transfer of any funds. Embodiments may provide alerts to the user that may educate the user as to the potential fraudulent activity, and may provide the user with one or more sources of additional information. This may slow down the transaction to provide the user an opportunity to make an informed decision about whether to proceed with the transaction.

Some embodiments of the present technology may encompass payment and authentication networks. The networks may include a communications interface. The networks may include one or more processors. The networks may include a memory having instructions stored thereon. When executed by the one or more processors the instructions may cause the one or more processors to receive, using the communications interface, transaction information associated with a transaction from a requesting system. The instructions may cause the one or more processors to generate a fraud risk score based on the transaction information. The instructions may cause the one or more processors to determine that the fraud risk score is indicative that the transaction is likely fraudulent. The instructions may cause the one or more processors to transmit an alert to a user device that informs a user of the user device that the transaction is likely fraudulent prior to generating an approval decision for the transaction.

In some embodiments, the instructions further cause the one or more processors to validate the user prior to generating the fraud risk score. The alert may include information about one or more possible forms of fraudulent activity. The alert may include a link to one or more sources of more detailed information about one or more possible forms of fraudulent activity. The alert may include an override feature that enables the user to accept the transaction. The alert may include a cancellation feature that enables the user to terminate the transaction without completing payment. The transaction information may include one or more variables selected from the group consisting of a payment amount, an identifier of the user, a recipient identifier, location data of the user, and location data of the recipient.

Some embodiments of the present technology may encompass methods of performing fraud detection. The methods may include receiving, using a communications interface, transaction information associated with a transaction from a requesting system. The methods may include generating a fraud risk score based on the transaction information. The methods may include determining that the fraud risk score is indicative that the transaction is likely fraudulent. The methods may include transmitting an alert to a user device that informs a user of the user device that the transaction is likely fraudulent prior to generating an approval decision for the transaction.

In some embodiments, the fraud risk score may be generated using a machine learning model. The machine learning model may be trained using transaction information from known fraudulent transactions. The machine learning model may include a deterministic machine learning model. The machine learning model may include a non-deterministic machine learning model. The methods may include determining one or more device characteristics associated with the requesting system. A form of the alert may be based on the one or more device characteristics. The one or more device characteristics may include device capabilities of the requesting system.

Some embodiments of the present technology may encompass non-transitory computer-readable mediums having instructions stored thereon. When executed by one or more processors, the instructions may cause the one or more processors to receive, using the communications interface, transaction information associated with a transaction from a requesting system. The instructions may cause the one or more processors to generate a fraud risk score based on the transaction information. The instructions may cause the one or more processors to determine that the fraud risk score is indicative that the transaction is likely fraudulent. The instructions may cause the one or more processors to transmit an alert to a user device that informs a user of the user device that the transaction is likely fraudulent prior to generating an approval decision for the transaction.

In some embodiments, the instructions may further cause the one or more processors to receive additional information associated with one or both of the user and a recipient. The fraud risk score may be generated based at least in part on the additional information. The additional information may include information associated with one or both of the user and the recipient selected from the group consisting of device information, payment history information, token activity information and transaction velocity information. The alert may cause the user device to emit a haptic notification. The fraud risk score may be generated using a machine learning model that is periodically retrained with updated fraudulent transaction information. The requesting system may include a merchant point of sale device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to fraud detection techniques that may help prevent fraudulent transactions that have been initiated by a rightful owner of a payment account. Embodiments may perform fraud risk scoring measures and may alert a user and/or the user's financial institution of any potential fraud prior to debiting a payment from the payment account. Embodiments may therefore enable transactions suspected of being fraudulent to be canceled unilaterally by the financial institution and/or alerts to be sent to the user that may enable the user to make an informed decision of whether to proceed with the transaction. Embodiments may provide technical solutions that provide network visibility that help consumers and merchants make better, more informed transaction decisions.

Figure 1:
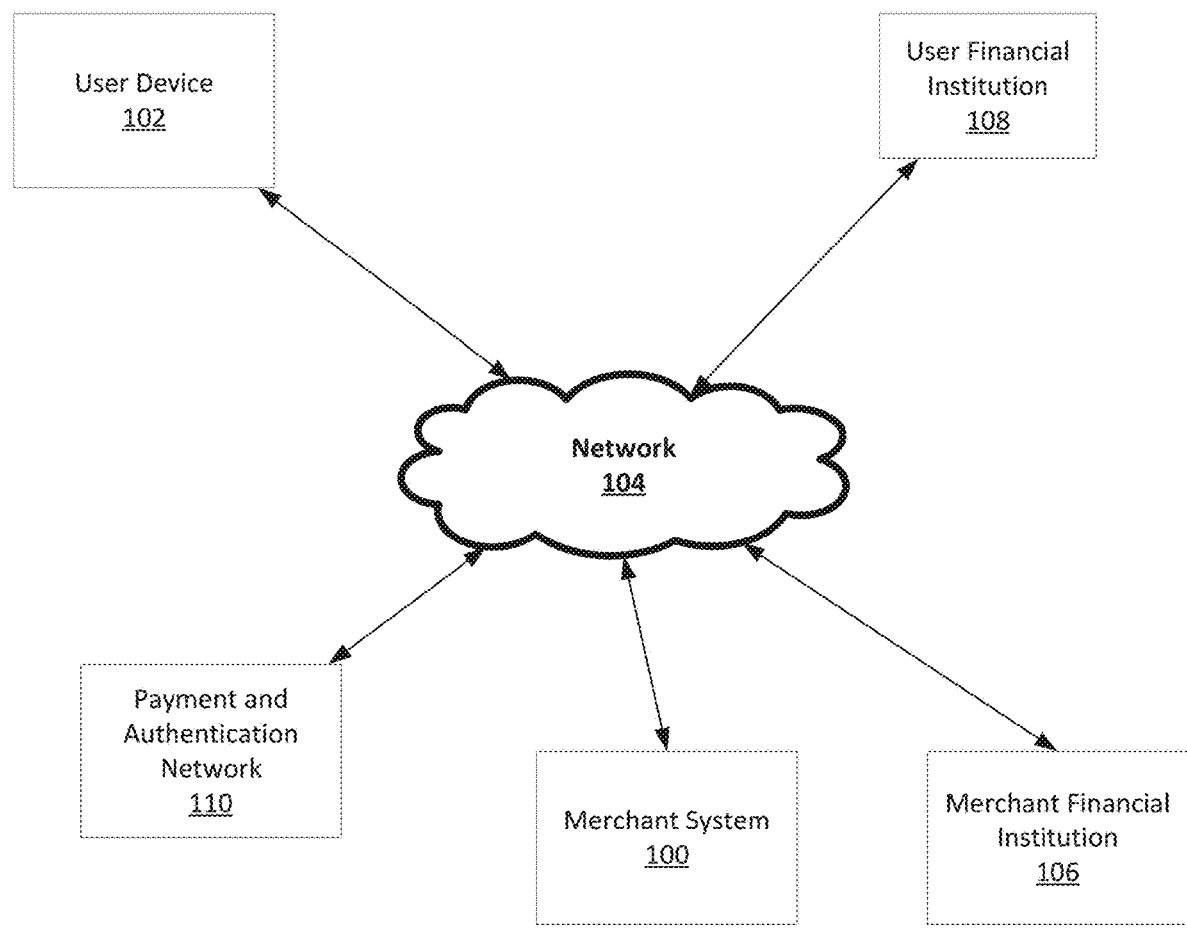
FIG. 1 illustrates a system for facilitating payments according to an embodiment of the present invention.

Turning now to FIG. 1, a system for facilitating payments is illustrated. The system may include one or more merchant systems 100 that provide goods and/or services. Each merchant system 100 may include one or more computing systems that facilitate interactions with users and/or back-end systems. The merchant systems 100 may be used to conduct transactions, manage inventory, invoice users, and/or perform any number of other functions. Each merchant system 100 may be associated with one or more merchant financial institutions 106 that may handle receipt of payments and/or authentication of a given merchant system 100 during a particular transaction. While referred to as merchant systems, it will be appreciated that such systems may encompass systems and/or devices that are associated with non-merchant entities, including individuals. As used herein, merchant systems may be understood to refer to systems and/or devices that may be involved in payment transactions.

Users may interact with the merchant systems 100 using one or more user devices 102 that communicate with the merchant systems 100 via one or more wired and/or wireless networks 104. Data transmitted across the networks 104 may be secured using encryption techniques, hypertext transfer protocol secure (HTTPS), secure sockets layer (SSL), transport layer security (TLS), and/or other security protocol. The user devices 102 may include mobile phones, tablet computers, personal computers, e-readers, and the like. In some embodiments, the user devices 102 may include computing devices, such as point of sale devices, that may be positioned at brick-and-mortar locations of a given merchant that may be usable by the users to interact with a given merchant system 100. The user devices 102 may access the merchant systems 100 via software applications and/or websites that are associated with and/or operated by a given merchant and that provide user interfaces that enable the users to complete transactions with the merchant systems 100.

Each user may be associated with one or more user financial institutions 108, which may each provide one or more payment accounts that are associated with the user and usable to pay for various transactions. In some embodiments, the user financial institutions 108 may also verify the identity of users and/or provide assurances that a selected payment account has sufficient funds to cover a particular transaction prior to the completion of the transaction. In some instances, a single financial institution may serve as both the merchant financial institution 106 and the user financial institution 108, while in other embodiments the merchant financial institution 106 and the user financial institution 108 may be distinct entities.

The system may include a payment and authentication network 110, which may be in communication with the merchant systems 100, user devices, merchant financial institutions 106, and/or the user financial institutions 108 via the one or more networks 104. The payment and authentication network 110 may facilitate authentication of the user involved in a particular transaction prior to the transfer of any payment. This may enable the user's identity to be verified prior to the completion of a payment transaction to protect merchants and/or other users from transactions initiated by unauthorized users by providing alerts and/or time for a merchant (or other user) to avoid a potentially fraudulent transaction. Additionally, the payment and authentication network 110 may perform fraud risk scoring and/or other fraud detection and mitigation services, which may help protect users and/or merchants from fraudulent transactions.

The payment and authentication network 110 may establish relationships with any number of user financial institutions 108. This may enable the payment and authentication network 110 to facilitate transactions that utilize payment accounts with each of the user financial institutions 108. Each user may create an account with the payment and authentication network 110. The user may then link one or more payment accounts from one or more user financial institutions 108 with the user's account with the payment and authentication network 110. Once having a registered account, the user may be able to utilize the authentication and fraud risk services provided by the payment and authentication network 110 when conducting transactions with merchant systems 100.

The payment and authentication network 110 may include a machine learning risk model (such as a Gradient Boosted Trees model) that has been trained to predict the probability that a given transaction between a sender (payer) and a recipient is fraudulent. For example, the risk model may be provided with data from a number of prior fraudulent transactions and a number of prior valid transactions. The risk model may be trained to identify various fraud risk factors (including transaction characteristics, merchant information, etc.) that may be indicative of fraudulent activity. The various factors may include, without limitation, a standard deviation of an amount sent and/or received by a sender and/or recipient (possibly over a predetermined time period), an inquiry/transaction amount for the present transaction, information related to dollar amounts received by the recipient in a particular time period, information related to dollar amounts sent and/or received by the sender in a particular time period, a number of successful transactions between the sender and recipient (possibly over a predetermined time period), a time elapsed since a first payment sent and/or received by the sender, a time elapsed since a most recent payment sent and/or received by the recipient, an average dollar amount in transactions between the sender and recipient (possibly over a predetermined time period), a total amount send and/or received by the recipient and/or sender (possibly over a predetermined time period), an average number of transactions per day by the sender and/or recipient (possibly over a predetermined time period), a maximum and/or minimum dollar amount sent and/or received by the sender and/or recipient (possibly over a predetermined time period), a number of unique senders involved in transactions with the recipient (possibly over a predetermined time period), a most common (or second, third, etc. most common) payment amount sent and/or received by the sender and/or recipient and/or a number of reoccurrences of such payment amount, a time elapsed since a most recent amount received and/or sent by the sender and/or recipient, an average haversine distance between a sender and all recipients they interacted with based on area of eligibility latitude-longitude data, a number of device identifiers have been registered to the sender and/or recipient, a total sum of username characters of all emails (i.e. before the "@" symbol) registered with the recipient and/or sender (possibly over a predetermined time period), a number emails belonging to the sender and/or recipient that have alphabetical characters in the email address, a mean number of days that accounts ever held statuses for the sender and/or recipient, a number of emails belonging to the sender and/or recipient that have ".com" extensions and/or have a common email domain, a number of characters in total for all of the sender and/or recipient's email domains, a time elapsed since an update to the payment profile linked to the recipient and/or sender, a number of first and/or last names linked to the recipient and/or sender, a number of financial institutions linked to the recipient and/or sender, a number of payment profiles linked to a recipient token, and/or other factors.

For example, a number of transactions that are known to be fraudulent and/or authentic may be provided to the machine learning model as input variables. Each transaction may include an indication of whether the particular transaction was fraudulent, along with other transaction and/or other information. For example, each transaction may include one or more pieces of transaction information, such as a payment amount, a time and/or date of the transaction, location data for the sender and/or recipient, a recipient identifier, a sender identifier, and/or other data. Additionally, some or all of the transactions may include additional information related to the recipient and/or sender, such as one or more of the fraud risk factors outlined above. The transaction information (and possibly the additional information) may be analyzed by the machine learning model in view of the indication of whether each transaction was authentic or fraudulent, enabling the machine learning model to generate a number of sets of transaction characteristics that are indicative of a high risk of fraud. When a new transaction is analyzed, the relevant transaction information and/or additional information may be supplied to the machine learning model, which may identify transaction characteristics associated with the new transaction to determine whether the new transaction is likely fraudulent.

In some embodiments, the risk model may behave deterministically (e.g., an inquiry with the same information scored by the model with the same feature values will always produce the same score). In other embodiments the risk model can be updated/retrained multiple times (e.g., the model can change upon retraining of the model, when the model goes through model governance, and/or when a new version of the model is deployed). In some embodiments, the payment and authentication network 110 may monitor current scams and other fraudulent activity. For example, the payment and authentication network 110 may receive information on fraudulent transactions and scams from the various user financial institutions 108 and/or other external sources. The payment and authentication network 110 and/or risk model may analyze this information to identify characteristics that are indicative of such fraud. For example, the payment and authentication network 110 and/or risk model may be supplied with transaction information and/or other data from known fraudulent transactions to identify combinations of different fraud risk factors (such as those described above) that may be indicative of a fraudulent transaction based on the information on fraudulent transactions and scams provided by the various user financial institutions 108 and/or other external sources. The payment and authentication network 110 may also maintain and update information and educational resources on the various fraudulent activities that may be used to instruct users and/or user financial institutions on how to handle various fraudulent activity. For example, information on what users should look for to detect fraudulent transactions and/or steps that may be taken to avoid and/or reduce the threat of falling victim to fraud. The payment and authentication network 110 may monitor trends in various scams, which may be used to keep information up to date and to best educate the various partners and users of the payment and authentication network 110.

Figure 2:
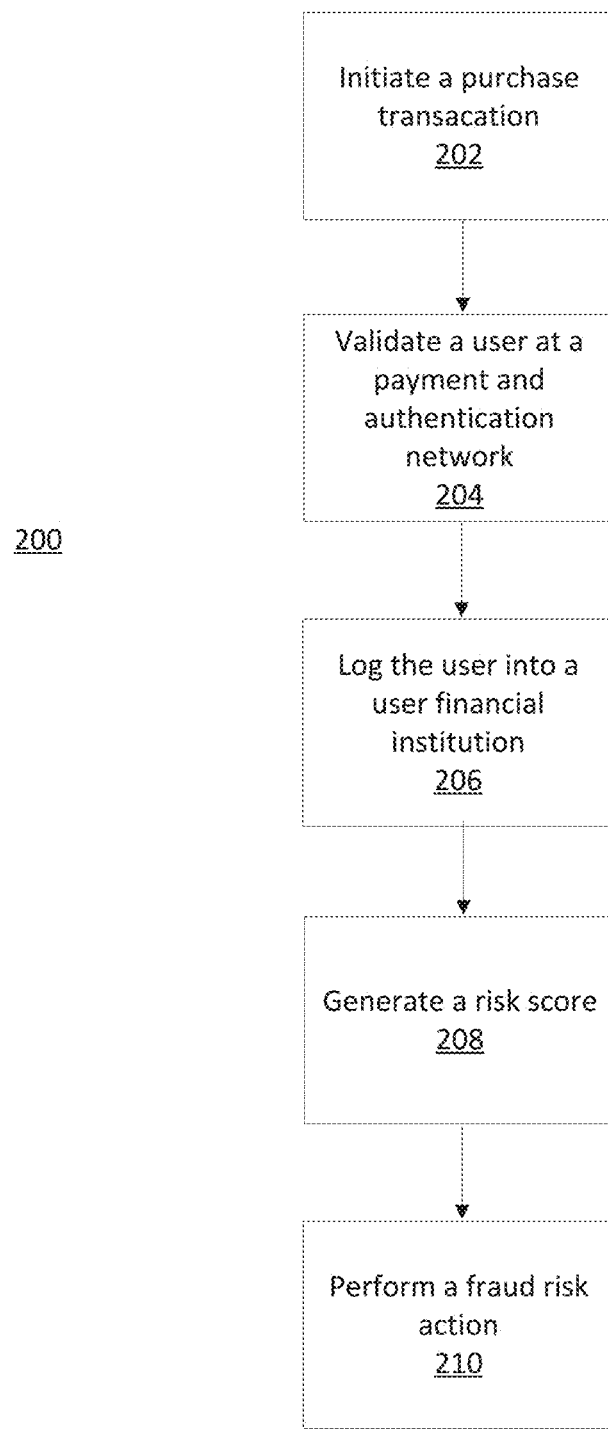
FIG. 2 is a flowchart illustrating a process for performing fraud risk detection according to an embodiment of the present invention.

FIG. 2 is a flowchart illustrating a process 200 of performing fraud detection according to an embodiment of the present invention. Process 200 may be performed by a user financial institution and/or the payment and authentication network 110. Process 200 may begin at block 202 by a user initiating a payment transaction at a merchant point of sale device (or other device used to conduct a payment transaction between two or more entities), which may be operated by one or more merchant systems 100. For example, the user may select one or more goods, services, and/or charitable contributions for purchase. The user may be provided with a price of the selections and may select one or more payment options to use for payment. The user may opt to pay for the selections using a payment source that is linked to the payment and authentication network 110. The merchant system 100 may direct the user to an authentication page associated with the payment and authentication network 110. In some embodiments, the merchant system 100 may also provide transaction data to the payment and authentication network 110. The transaction information may include information associated with the transaction, such as user identification information provided by the user and/or retrieved from an account associated with the user at the merchant system 100 (a name, an address, a phone number, an account number or other identifier of the selected payment option, etc.), a user device identifier, a payment amount, a merchant name and/or other merchant identifier, a unique transaction identifier (which may be generated by the merchant system 100), and/or other information associated with the transaction.

The user may be validated with the payment and authentication network 110 at operation 204. In some embodiments, the authentication system may validate the user using validation information, such as a token, the user's name, the user's address, and/or other information. This information may be supplied with and/or extracted from the transaction information and/or may be provided by the user. To validate the user, the validation information may be compared with similar information (name, address, etc.) from other sources. For example, similar information may be pulled from 1) profile data from the user's account with the payment and authentication network 110, 2) the user identification information supplied by the merchant system 100, and/or 3) mobile network operator (MNO) data (such as user identification information, device information (such as an international mobile equipment identity (IMEI)), phone numbers, etc. associated with the user's user device 102 (when the user device 102 is a mobile phone)). The MNO data may be retrieved from an external source, which may be identified using user information included in the transaction information. For example, the phone number In some embodiments, such as when the user device 102 is not a mobile phone, other information may be used, such as another device identifier, IP address, and/or other information. The payment and authentication network 110 may compare the user's name and address and/or other information to the validation information to see if similar information from the various sources match one another. If the information matches, the user may be validated and the user may be redirected to an authentication page of a website or software interface associated with the user's financial institution 108.

Upon successful validation, the user may actively log in or be passively logged into the user financial institution 108 and may select one or more payment accounts associated with the user financial institution 108 at operation 206. For example, the consumer may provide one or more credentials (such as a username, password, biometric token, and/or other credential) associated with the consumer financial institution 108 to the authentication page to be authenticated by the consumer financial institution 108 prior to any funds being withdrawn from the selected payment account. The authentication of the consumer provides an assurance to the merchant that the transaction has been properly authorized by the consumer and consumer financial institution 108 and that the merchant will receive good funds, thus reducing the risk of payment returns due to unauthorized transactions. The consumer financial institution 108 may use information like mobile authentication, device ID, user patterns, face or other biometrics or other identifiers to authenticate the consumer. In some embodiments, the authentication of the consumer may be done by the consumer financial institution 108, a third party authorized by the consumer financial institution 108 and/or the payment and authentication network 110. When authentication is performed by the payment and authentication network 110, a default set of authentication factors may be used to authenticate consumers for each consumer financial institution 108 and/or some or all of the consumer financial institutions 108 may pre-select their own set of factors and/or authentication measures (biometric, multi-factor, etc.) that will be considered in the authentication process. In some embodiments, a passive authentication process may be initiated. For example, when the consumer has previously authenticated with the payment and authentication network 110 and/or consumer financial institution 108 from the same user device 102. In such instances, the payment and authentication network 110 may compare information such as device identifiers, IP addresses, browser cookies, and/or other information to data from the consumers account with the payment and authentication network 110 to authenticate the consumer, without requiring the consumer to access an authentication page of the consumer financial institution 108.

Prior to the transfer of any funds, the payment and authentication system 110 may generate a risk score at operation 208. The risk score may be determine using a risk score model, which may utilize machine learning in some embodiments. As part of the risk scoring, the payment and authentication network 110 may receive transaction information from the user and/or merchant system 100 associated with the transaction. The transaction information may include a payment amount, an identifier of the user, a recipient identifier, location data of the user and/or recipient. In other embodiments the transaction data can include location data provided by one or more financial institutions. Additional information may be received by the payment and authentication network 110 from the user device 102, merchant system 100, and/or other external source. For example, the additional information may include device information (such as a device identifier), user/recipient payment history information, token activity information associated with the user and/or the merchant system 100, transaction velocity information associated with the merchant, any of the fraud risk factors outlined above, and the like.

The payment and authentication network 110 may analyze some or all of the collected information. In some embodiments, the analysis may involve supplying at least some of the collected information (e.g., relevant transaction information and/or additional information) to the machine learning model (e.g., risk model), which may identify transaction characteristics associated with the new transaction (such as by comparing the transaction characteristics to those of known fraudulent transactions and/or by determining a category assignment for the transaction based on the machine learning data) to determine whether the transaction is likely fraudulent. In some embodiments the collected information may be analyzed in at least one of the following ways: (1) looking at previous payment amounts both sent AND received by at least one of the user or recipient in a payment (e.g., a payment and authentication network 110 user), (2) aggregating previous payments with the same user and same receiver, and/or (3) aggregating previous payments where the current user is the recipient and the current recipient is the user. In some embodiments two or more of the above ways can be used simultaneously to analyze the sender/receiver data. The risk model may generate a risk score (e.g., a numerical value) that is indicative of a likelihood that the present transaction is fraudulent. In some embodiments in addition to a score, key factors that describe what aspects of the payment were important in determining the score may be provided. In some embodiments the key factors may be non-numeric character strings.

The risk score may be provided to the user financial institution 108, possibly along with an explanation of a reason for the transaction being high risk (when applicable). The calculation of the risk score may be consistent across all payment accounts, may vary depending on a type of payment media involved, and/or may vary depending on the user financial institution 108 associated with the selected payment account. For example, one or more user financial institutions 108 may instruct the payment and authentication network 110 to weigh risk factors differently within the risk model and/or may have different risk acceptance thresholds.

One or more fraud risk actions may be performed at operation 210. In some embodiments, each user financial institution 108 may have its own proprietary risk score threshold system, while in other embodiments some or all of the user financial institutions 108 may include a same risk score threshold system. Each risk score threshold system may include one or more thresholds for triggering one or more fraud risk actions based on the risk score of the transaction. For example, in some embodiments, upon having a sufficiently acceptable fraud risk score, the user financial institution 108 may approve the payment and provide the user a confirmation the payment was successfully completed. If the risk score is below a lowest threshold, the payment and authentication network 110 and/or the user financial institution 108 may automatically cancel the transaction and inform the user of the cancellation. When alerting the user, the payment and authentication network 110 and/or the user financial institution 108 may just indicate the transaction was canceled/declined and/or may include an indication of why the transaction was canceled (e.g., risk of fraud). Another threshold may trigger the payment and authentication network 110 and/or the user financial institution 108 to conduct a manual review of the transaction for fraud and/or Office of Foreign Assets Control (OFAC) risk. This may result in a delay of payment and/or a cancellation of the transaction. The payment and authentication network 110 and/or the user financial institution 108 may notify the user of the pending review, which may enable the user to have an opportunity to change to a non-reviewed payment type (e.g., cash), cancel the transaction, and/or reach out to the payment and authentication network 110 and/or the user financial institution 108 to get more information about the pending transaction and/or potential risk. For example, the notification may include a phone number, URL, email address, and/or other communication address that the user may use to discuss or otherwise gain additional information related to the present transaction.

In some instances, the risk score may indicate a potential scam risk, which may trigger an additional confirmation step by the user to complete the payment transaction. For example, if the payment and authentication network 110 may alert the user that the transaction may be a scam or other fraud and may give the user the option to cancel the transaction. This may provide the user with time and information necessary to make an informed decision regarding whether to continue with the transaction. The payment and authentication network 110 may require a confirmation from the user if the user wishes to continue with the transaction. In some embodiments, the user financial institution 108 and/or the payment and authentication network 110 may inform the user that if the user process with the transaction that has been flagged as a possible scam, the payment and authentication network 110 and/or user financial institution 108 may reduce and/or eliminate any fraud protection features offered in relation to the transaction. This enables the payment and authentication network 110 and/or user financial institution 108 to protect themselves from possible scams and fraud in the event that the user is comfortable assuming the risk that the transaction is part of a scam and/or other fraudulent activity.

In some embodiments, when the payment and authentication network 110 alerts the user that the transaction may be a scam, the alert may include additional information about one or more known scam types. For example, the information may include a description of known scams, which may include warning signs for the user to look for in identifying a given scam. The alert may include an indication of why the payment and authentication network 110 flagged the transaction as potentially being a scam and/or otherwise fraudulent. The information may also include a link (such as a universal resource locator (URL)) that directs the user to one or more sources that contain detailed information on known scams that may assist the user in making an informed decision. The information available to the user may be related to scams that are potentially similar to the current transaction, related to the most common scams, related to the most currently common scams (such as scams that are most frequently occurring within a given period of time, such as the last 90 days, last 30 days, last week, etc.), and/or may be provided in some other manner. In some embodiments, the alert may include a phone number, URL, email address, and/or other communication address that the user may use establish a communication link with an expert who may provide guidance on the potential fraudulent activity.

The alert may be sent via various electronic notification formats. For example, the alert may be provided within a transaction window of the user interface of the user device 102, via a push notification, an email, a short message service (SMS) message, a voice alert, as haptic feedback, and/or other format. In some embodiments, the alert may be sent in a format chosen by the user, payment and authentication network 110, and/or the user financial institution 108. In other embodiments, information (such as the device information, location information, etc.) may be used by the payment and authentication network 110 to determine a proper format for the alert. For example, if the device information indicates that the user device 102 is a car infotainment system, an audio message may be provided to ensure that the user may safely receive the alert without needing to see the alert. If the information indicates that the user device 102 is a mobile phone, the alert may include an audio and/or haptic alert that has a unique pattern or sound to alert the user of the potential risk and/or to look at his user device 102 to view a visible alert.

It will be appreciated that while described as being performed by the payment and authentication network 110, one or more of the risk scoring and alerting functions may be performed by the user financial institution 108 in various embodiments. The risk model may be operated by the payment and authentication network 110 and/or by the user financial institution 108.

Figure 3:
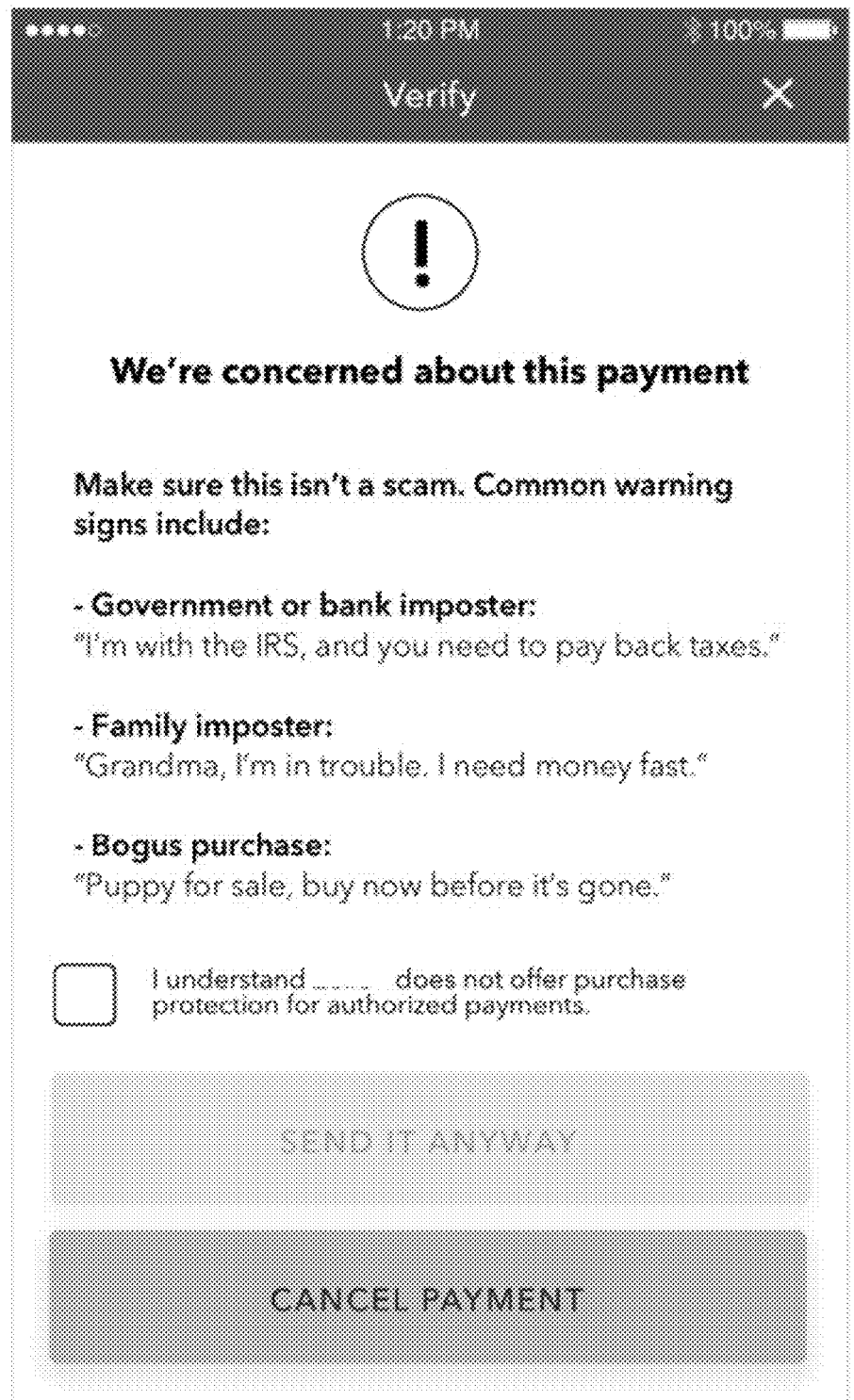
FIG. 3 illustrates a fraud risk alert according to an embodiment of the present invention.

FIG. 3 illustrates one embodiment of a fraud risk alert. As illustrated, the alert is provided as a page within a user interface of a website and/or software application (such as a merchant web portal) that is being used to conduct the transaction. However, it will be appreciated that the alert may take many forms, including emails, SMS messages, push notifications, audio messages, haptic alerts, and the like. In some embodiments, multiple forms of alerts may be sent to the user for a given transaction.

The alert may include an indication that the payment and authentication network 110 and/or user financial institution 108 believes there is a high risk that the potential transaction is fraudulent. The alert may include information on one or more known types of scams. The information may include scams that are related to the current fraud risk and/or may include other scam information, such as information associated with common types of scams and/or other fraudulent activity. The alert may include an option to cancel the payment and/or to override the fraud risk and proceed with payment. In some embodiments, a message may be included that informs the user that if he overrides the fraud risk that fraud protection offered by the payment and authentication network 110 and/or user financial institution 108 may be waived. In some embodiments, a link to one or more sources of information on scams may be included for the user.

In some embodiments, similar fraud detection may occur in transactions that involve payment requests being sent to a user, such as by a biller on a merchant platform (such as a website or software application). This may be particularly useful in helping users prevent making payments to fraudulent people who are posing as trusted billers (such as the user's utility companies, bank, etc.). For example, a user may receive a request for payment from a biller. The user may select to pay with a payment account that is linked to the payment and authentication network 110. The payment and authentication network 110 may validate the user and may generate a fraud risk score for the transaction. In addition to considering transaction information as described above, the risk score for the payment request may analyze the payment request itself. For example, the risk scoring model may analyze one or more details of the payment request, such as spelling of entity names within the payment request, formatting of different elements (such as company names/logos, etc.), a monetary amount of the payment request, a timing of the payment request, a frequency of requests associated with the requesting party, and/or other information. Oftentimes, fraudulent requests include one or more errors, such as typographical errors, formatting errors, and the like. The risk scoring model may analyze the request and detect any such errors or other red flags that may be indicative of a fraudulent request. If fraud is detected, the payment and authentication network may alert the user and/or provide additional information on possible scams and/or other fraudulent activity such as described above.

In some embodiments, when an entity requests a payment, the system screens the requestor to determine if the requestor is the legitimate entity (e.g., a "fake" invoice requesting $500 which looks like it is from the electric company is sent along with payment request: the system (1) screens the requestor, (2) examines/interrogates the image of the invoice (looking at the requested amount, date of the request, the source of the request the dollar amount, the invoice number, the position of the logo, etc.), and, then (3) if the invoice is determined to be fake, the system blocks the invoice from being presented and/or sends a warning message to the recipient (e.g., "warning" this could be a fake invoice please contact the biller)). In other embodiments, if an invoice isn't presented, but there is a request to pay, the system applies a model to look at the date of the request, the amount, the requestor, and other relevant information to identify potentially high risk transactions and/or fraudulent payment requests.

Figure 4:
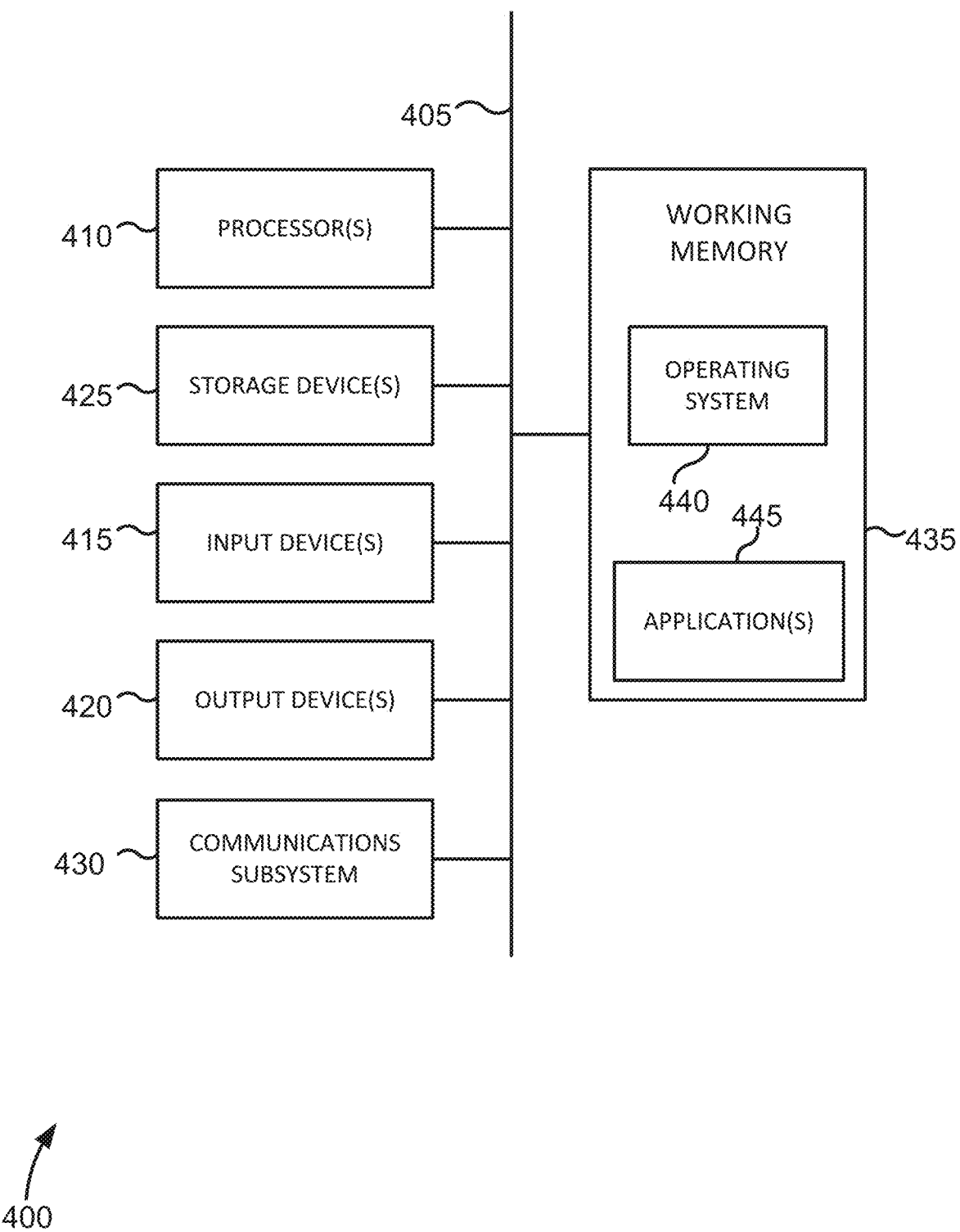
FIG. 4 is a block diagram of a computing system according to an embodiment of the present invention.

A computer system as illustrated in FIG. 4 may be incorporated as part of the previously described computerized devices. For example, computer system 400 can represent some of the components of computing devices, such as merchant system 100, user device 102, merchant financial institution 106, user financial institution 108, payment and authentication network 110, and/or other computing devices described herein. FIG. 4 provides a schematic illustration of one embodiment of a computer system 400 that can perform the methods provided by various other embodiments, as described herein. FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include a processing unit 410, including without limitation one or more processors, such as one or more central processing units (CPUs), graphical processing units (GPUs), special-purpose processors (such as digital signal processing chips, graphics acceleration processors, and/or the like); one or more input devices 415, which can include without limitation a keyboard, a touchscreen, receiver, a motion sensor, a camera, a smartcard reader, a contactless media reader, and/or the like; and one or more output devices 420, which can include without limitation a display device, a speaker, a printer, a writing module, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communication interface 430, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 430 may permit data to be exchanged with a network (such as the network described below, to name one example), other computer systems, and/or any other devices described herein. In many embodiments, the computer system 400 will further comprise a non-transitory working memory 435, which can include a RAM or ROM device, as described above.

The computer system 400 also can comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 410, applications 445, etc.) Further, connection to other computing devices such as network input/output devices may be employed.

Some embodiments may employ a computer system (such as the computer system 400) to perform methods in accordance with the disclosure. For example, some or all of the procedures of the described methods may be performed by the computer system 400 in response to processing unit 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the storage device(s) 425. Merely by way of example, execution of the sequences of instructions contained in the working memory 435 might cause the processing unit 410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 400, various computer-readable media might be involved in providing instructions/code to processing unit 410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 425. Volatile media include, without limitation, dynamic memory, such as the working memory 435. Transmission media include, without limitation, coaxial cables, copper wire, and fiber optics, including the wires that comprise the bus 405, as well as the various components of the communication interface 430 (and/or the media by which the communication interface 430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 430 (and/or components thereof) generally will receive the signals, and the bus 405 then might carry the signals (and/or the data, instructions, etc. carried by the signals) to the working memory 435, from which the processor(s) 410 retrieves and executes the instructions. The instructions received by the working memory 435 may optionally be stored on a non-transitory storage device 425 either before or after execution by the processing unit 410.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A payment and authentication network, comprising:
   a communications interface;
   one or more processors; and
   a memory having instructions stored thereon that, when executed by the one or more processors cause the one or more processors to:
   receive, using the communications interface, transaction information associated with a transaction from a requesting system, wherein the transaction information comprises a payment amount of the transaction, a time and date of the transaction, a sender identifier of the transaction, a recipient identifier of the transaction, and location data for one or both of a recipient and a sender of the transaction;
   train a machine learning model to generate fraud risk scores based on a probability that a given transaction between a sender and a recipient is fraudulent by:
      providing data from a plurality of prior fraudulent transactions and a plurality of prior valid transactions to the machine learning model as input variables, wherein:
         each of the plurality of prior fraudulent transactions and each of the plurality of prior valid transactions comprises an indication of whether a particular transaction was fraudulent; and
         each of the plurality of prior fraudulent transactions and each of the plurality of prior valid transactions comprises a payment amount of the particular transaction, a time and date of the particular transaction, a sender identifier of the particular transaction, a recipient identifier of the particular transaction, and location data for one or both of a recipient and a sender of the particular transaction; and
      identifying, by the machine learning model, a plurality of risk factors that are indicative of fraudulent activity based on the plurality of prior fraudulent transactions and the plurality of prior valid transactions, wherein:
         the plurality of risk factors comprise one or both of characteristics about a given transaction and characteristics of one or both parties to a given transaction that are indicative of fraudulent activity;
         the plurality of risk factors comprise:
            a standard deviation of an amount received by a given recipient over a predetermined time period; and
            a standard deviation of an amount sent by a given sender over a predetermined time period; and
         the plurality of risk factors further comprise:
            an average haversine distance between the given sender and all recipients the given sender interacted with based on an area of eligibility latitude-longitude data;
            a number device identifiers that have been registered to one or both of the given sender and the given recipient;
            a total sum of username characters of email addresses registered to one or both of the given sender and the given recipient;
            a number of email addresses having ".com" extensions that have been registered to one or both of the given sender and the given recipient; and
            a number of email addresses having a common email domain that have been registered to one or both of the given sender and the given recipient;
   provide the transaction information to the machine learning model;
   generate, using the machine learning model, a fraud risk score for the transaction that indicates a likelihood that the transaction is fraudulent, wherein the fraud risk score is generated based on the machine learning model identifying one or more of the plurality of risk factors that match with one or both of characteristics about the transaction and characteristics of one or both of the recipient and the sender of the transaction based on the transaction information;
   determine that the fraud risk score is indicative that the transaction is likely fraudulent; and
   transmit an alert to a user device that informs a user of the user device that the transaction is likely fraudulent prior to generating an approval decision for the transaction.

2. The payment and authentication network of claim 1, wherein:
   the instructions further cause the one or more processors to validate the user prior to generating the fraud risk score.

3. The payment and authentication network of claim 1, wherein:
   the alert comprises information about one or more possible forms of fraudulent activity.

4. The payment and authentication network of claim 1, wherein:
   the alert comprises a link to one or more sources of more detailed information about one or more possible forms of fraudulent activity.

5. The payment and authentication network of claim 1, wherein:
   the alert comprises an override feature that enables the user to accept the transaction.

6. The payment and authentication network of claim 1, wherein:
   the alert comprises a cancellation feature that enables the user to terminate the transaction without completing payment.

7. The payment and authentication network of claim 1, wherein:

the alert comprises information about one or more known scam types.

8. A method of performing fraud detection, comprising:
receiving, using a communications interface, transaction information associated with a transaction from a requesting system, wherein the transaction information comprises a payment amount of the transaction, a time and date of the transaction, a sender identifier of the transaction, a recipient identifier of the transaction, and location data for one or both of a recipient and a sender of the transaction;
training a machine learning model to generate fraud risk scores based on a probability that a given transaction between a sender and a recipient is fraudulent by:
providing data from a plurality of prior fraudulent transactions and a plurality of prior valid transactions to the machine learning model as input variables, wherein:
each of the plurality of prior fraudulent transactions and each of the plurality of prior valid transactions comprises an indication of whether a particular transaction was fraudulent; and
each of the plurality of prior fraudulent transactions and each of the plurality of prior valid transactions comprises a payment amount of the particular transaction, a time and date of the particular transaction, a sender identifier of the particular transaction, a recipient identifier of the particular transaction, and location data for one or both of a recipient and a sender of the particular transaction; and
identifying, by the machine learning model, a plurality of risk factors that are indicative of fraudulent activity based on the plurality of prior fraudulent transactions and the plurality of prior valid transactions, wherein:
the plurality of risk factors comprise one or both of characteristics about a given transaction and characteristics of one or both parties to a given transaction that are indicative of fraudulent activity;
the plurality of risk factors comprise:
a standard deviation of an amount received by a given recipient over a predetermined time period; and
a standard deviation of an amount sent by a given sender over a predetermined time period; and
the plurality of risk factors further comprise:
an average haversine distance between the given sender and all recipients the given sender interacted with based on an area of eligibility latitude-longitude data;
a number device identifiers that have been registered to one or both of the given sender and the given recipient;
a total sum of username characters of email addresses registered to one or both of the given sender and the given recipient;
a number of email addresses having ".com" extensions that have been registered to one or both of the given sender and the given recipient; and
a number of email addresses having a common email domain that have been registered to one or both of the given sender and the given recipient;
providing the transaction information to the machine learning model;
generating, using the machine learning model, a fraud risk score for the transaction that indicates a likelihood that the transaction is fraudulent, wherein the fraud risk score is generated based on the machine learning model identifying one or more of the plurality of risk factors that match with one or both of characteristics about the transaction and characteristics of one or both of the recipient and the sender of the transaction based on the transaction information;
determining that the fraud risk score is indicative that the transaction is likely fraudulent; and
transmitting an alert to a user device that informs a user of the user device that the transaction is likely fraudulent prior to generating an approval decision for the transaction.

9. The method of performing fraud detection of claim 8, wherein:
the machine learning model comprises a deterministic machine learning model.

10. The method of performing fraud detection of claim 8, wherein:
the machine learning model comprises a non-deterministic machine learning model.

11. The method of performing fraud detection of claim 8, further comprising:
determining one or more device characteristics associated with the requesting system, wherein a form of the alert is based on the one or more device characteristics.

12. The method of performing fraud detection of claim 11, wherein:
the one or more device characteristics comprise device capabilities of the requesting system.

13. A non-transitory computer-readable medium having instructions stored thereon that, when executed by one or more processors, cause the one or more processors to:
receive, using a communications interface, transaction information associated with a transaction from a requesting system, wherein the transaction information comprises a payment amount of the transaction, a time and date of the transaction, a sender identifier of the transaction, a recipient identifier of the transaction, and location data for one or both of a recipient and a sender of the transaction;
train a machine learning model to generate fraud risk scores based on a probability that a given transaction between a sender and a recipient is fraudulent by:
providing data from a plurality of prior fraudulent transactions and a plurality of prior valid transactions to the machine learning model as input variables, wherein:
each of the plurality of prior fraudulent transactions and each of the plurality of prior valid transactions comprises an indication of whether a particular transaction was fraudulent; and
each of the plurality of prior fraudulent transactions and each of the plurality of prior valid transactions comprises a payment amount of the particular transaction, a time and date of the particular transaction, a sender identifier of the particular transaction, a recipient identifier of the particular transaction, and location data for one or both of a recipient and a sender of the particular transaction; and
identifying, by the machine learning model, a plurality of risk factors that are indicative of fraudulent activity based on the plurality of prior fraudulent transactions and the plurality of prior valid transactions, wherein:

the plurality of risk factors comprise one or both of characteristics about a given transaction and characteristics of one or both parties to a given transaction that are indicative of fraudulent activity;

the plurality of risk factors comprise:
- a standard deviation of an amount received by a given recipient over a predetermined time period; and
- a standard deviation of an amount sent by a given sender over a predetermined time period; and the plurality of risk factors further comprise:
- an average haversine distance between the given sender and all recipients the given sender interacted with based on an area of eligibility latitude-longitude data;
- a number device identifiers that have been registered to one or both of the given sender and the given recipient;
- a total sum of username characters of email addresses registered to one or both of the given sender and the given recipient;
- a number of email addresses having ".com" extensions that have been registered to one or both of the given sender and the given recipient; and
- a number of email addresses having a common email domain that have been registered to one or both of the given sender and the given recipient;

provide the transaction information to the machine learning model;

generate, using the machine learning model, a fraud risk score for the transaction that indicates a likelihood that the transaction is fraudulent, wherein the fraud risk score is generated based on the machine learning model identifying one or more of the plurality of risk factors that match with one or both of characteristics about the transaction and characteristics of one or both of the recipient and the sender of the transaction based on the transaction information;

determine that the fraud risk score is indicative that the transaction is likely fraudulent; and transmit an alert to a user device that informs a user of the user device that the transaction is likely fraudulent prior to generating an approval decision for the transaction.

14. The non-transitory computer-readable medium of claim 13, wherein the instructions further cause the one or more processors to:

receive additional information associated with one or both of the user and a recipient, wherein the fraud risk score is generated based at least in part on the additional information.

15. The non-transitory computer-readable medium of claim 14, wherein:

the additional information comprises information associated with one or both of the user and the recipient selected from the group consisting of device information, payment history information, token activity information and transaction velocity information.

16. The non-transitory computer-readable medium of claim 13, wherein:

the alert causes the user device to emit a haptic notification.

17. The non-transitory computer-readable medium of claim 13, wherein:

the machine learning model is periodically retrained with updated fraudulent transaction information.

18. The non-transitory computer-readable medium of claim 13, wherein:

the requesting system comprises a merchant point of sale device.

* * * * *